United States Patent [19]

Sundararajan et al.

[11] Patent Number: 5,275,903
[45] Date of Patent: Jan. 4, 1994

[54] MODIFIED THERMOTROPIC LIQUID CRYSTALLINE COMPOSITIONS

[75] Inventors: Pudupadi R. Sundararajan; Terry L. Bluhm, both of Oakville; Stephan Drappel, Toronto, all of Canada

[73] Assignee: Xerox Corporation, Stamford, Conn.

[21] Appl. No.: 879,677

[22] Filed: May 7, 1992

[51] Int. Cl.$^5$ .............................. G03G 9/00
[52] U.S. Cl. ................... 430/109; 430/110; 430/111; 430/126; 430/137; 430/138
[58] Field of Search ............. 430/109, 110, 111, 126, 430/137, 138

[56] References Cited

U.S. PATENT DOCUMENTS

| | | | |
|---|---|---|---|
| 3,655,256 | 4/1972 | Claytor et al. | 350/3.5 |
| 3,655,270 | 4/1972 | Creagh | 350/160 |
| 3,873,181 | 3/1975 | Chivian et al. | 350/3.5 |
| 4,543,313 | 9/1985 | Mahabadi et al. | 430/109 |
| 4,615,962 | 10/1986 | Garito | 430/20 |
| 4,780,383 | 10/1988 | Garrett et al. | 430/11 |
| 4,818,070 | 4/1989 | Gunjima et al. | 350/334 |
| 4,855,209 | 8/1989 | Martine et al. | 430/126 |
| 4,891,293 | 1/1990 | Sacripante et al. | 430/109 |
| 4,929,658 | 5/1990 | Kohtoh et al. | 524/219 |
| 4,959,252 | 9/1990 | Bonnebat et al. | 428/64 |
| 4,973,539 | 11/1990 | Sacripante et al. | 430/109 |
| 5,030,533 | 7/1991 | Bluhm et al. | 430/59 |
| 5,035,970 | 7/1991 | Hsieh et al. | 430/109 |

OTHER PUBLICATIONS

Macromolecules 1992, 25, 1177–1183.

*Primary Examiner*—John Kight, III
*Assistant Examiner*—Shelley A. Dodson
*Attorney, Agent, or Firm*—Judith L. Byorick

[57] ABSTRACT

Disclosed is a composition comprising a thermotropic liquid crystalline polymer and a modifying component selected from the group consisting of plasticizing agents, antiplasticizing agents, small molecule liquid crystalline materials, and mixtures thereof. Also disclosed is a toner composition comprising a thermotropic liquid crystalline resin, a colorant, and a modifying component selected from the group consisting of plasticizing agents, antiplasticizing agents, small molecule liquid crystalline materials, and mixtures thereof.

24 Claims, No Drawings

MODIFIED THERMOTROPIC LIQUID CRYSTALLINE COMPOSITIONS

BACKGROUND OF THE INVENTION

The present invention is directed to plasticized thermotropic liquid crystalline polymers and to toner compositions for developing electrostatic latent images. More specifically, the present invention is directed to thermotropic liquid crystalline polymers containing plasticizer or antiplasticizer additives and to toner compositions containing liquid crystalline polymers modified with plasticizers or antiplasticizers. One embodiment of the present invention is directed to a composition comprising a thermotropic liquid crystalline resin and a modifying component selected from the group consisting of plasticizing agents, antiplasticizing agents, small nonpolymeric liquid crystalline molecules, and mixtures thereof. Another embodiment of the present invention is directed to a toner composition comprising a thermotropic liquid crystalline resin, a colorant, and a modifying component selected from the group consisting of plasticizing agents, antiplasticizing agents, small molecule liquid crystalline materials, and mixtures thereof.

Toner compositions containing liquid crystalline materials are known. For example, U.S. Pat. No. 4,543,313 (Mahabadi et al.), the disclosure of which is totally incorporated herein by reference, discloses toner compositions comprising resin particles selected from the group consisting of thermotropic liquid crystalline polycarbonates, copolycarbonates, polyurethanes, polyesters, and copolyesters, and pigment particles.

U.S. Pat. No. 4,891,293 (Sacripante et al.), the disclosure of which is totally incorporated herein by reference, discloses thermotropic liquid crystalline polymers of specific formulae, and toner and developer compositions containing these polymers.

U.S. Pat. No. 4,973,539 (Sacripante et al.), the disclosure of which is totally incorporated herein by reference, discloses a toner composition comprising a crosslinked thermotropic liquid crystalline polymer, a branched liquid crystalline polymer, or mixtures thereof.

U.S. Pat. No. 5,030,533 (Bluhm et al.), the disclosure of which is totally incorporated herein by reference, discloses a photoresponsive imaging member comprising a photogenerating layer and a charge transport layer comprising hole transport molecules dispersed in a resin binder mixture wherein at least one of the resins is a liquid crystalline thermotropic polymer.

U.S. Pat. No. 3,655,256 (Claytor et al.) discloses methods and apparatus for reproducing optical information in thermochromic materials. Exemplary materials are the ternary halides, ternary chalcogenides, and certain transition metal oxides. Methods and apparatus are also disclosed for recording holographic images with infrared radiation and reconstruction infrared holograms in the visible portion of the spectrum.

U.S. Pat. No. 3,655,270 (Creagh) discloses a display device wherein a layer of a novel nematic mesomorphic composition that is normally transparent to light scatters light in response to a voltage applied across the composition. The composition consists essentially of a ternary mixture of 4-ethoxybenzylidene-4'-n-butylaniline, 4-methoxybenzylidene-4'-amino-phenyl butyrate, and bis-(4'-n-octyloxybenzal)-2-chloro-1,4-phenylenediamine, and exhibits the nematic mesophase over a broad temperature range that includes room temperature.

U.S. Pat. No. 3,873,181 (Chivian et al.) discloses methods and apparatus for recording and reproducing optical information in thermochromic materials. Exemplary materials are the ternary halides, ternary chalcogenides, and certain transition metal oxides. Also disclosed are optical data processing apparatus using long wavelength radiation, and devices utilizing techniques for quality control or semiconductor device fabrication. Relatively compact optical correlators using infrared radiation and adapted to sort mail are also disclosed.

U.S. Pat. No. 4,615,962 (Garito) discloses dialkenyl diacetylenes, especially divinyl diacetylenes having liquid crystalline phases. The diacetylenes having liquid crystalline phases may be polymerized while in the liquid crystalline state to yield conjugated polymers. The processes for the polymerization of the liquid crystalline diacetylenes and for the elaboration of useful optical, electro-optical, electro-acoustic, mechanical, thermal, structural, waveguiding, and other articles are also disclosed.

U.S. Pat. No. 4,780,383 (Garrett et al.) discloses a process for optical storage which utilizes a photopolymerizable liquid crystalline material having cholesteric optical properties. By selectively adjusting the reflectance or transmittance properties of the recording medium such that specific wavelength bands of light are reflected or transmitted, and then substantially permanently fixing the reflectance or transmittance characteristics of the film by photopolymerization, multiple wavelength-dependent information can be stored in each dot. Accordingly, the capacity of the recording medium is substantially expanded when compared to conventional optical storage media.

U.S. Pat. No. 4,818,070 (Gunjima et al.) discloses a liquid crystal optical device comprising a pair of substrates provided with electrodes and a layer containing a liquid crystal material sandwiched between the pair of substrates, wherein the layer is formed by irradiating light to a mixture of a liquid crystal material and a photocurable compound selected so that the refractive index of the resulting cured product agrees to either the ordinary refractive index or the extraordinary refractive index of the liquid crystal material used, or the refractive index of the liquid material when it is randomly oriented, held between the pair of substrates provided with electrodes, to cure the photocurable compound and fix the resulting phase separation of the liquid crystal material and the cured product, wherein the layer has at least a portion optically oriented by applying a voltage to the portion across the substrates during the irradiation of light to cure the photocurable compound.

U.S. Pat. No. 4,929,658 (Kotoh et al.) discloses a composition to be used as an agent for aligning liquid crystals in a liquid crystal cell, wherein liquid crystal molecules are aligned with an increased pretilt angle with respect to the substrate, the composition consisting essentially of a polyimide resin precursor and a precursor of a diimide compound.

U.S. Pat. No. 4,959,252 (Bonnebat et al.) discloses rigid, dimensionally stable, essentially circular and planar, axially injection molded disc members, well adapted as support substrates for radiation sensitive layers for optical discs such as laser discs which comprise radially molecularly oriented thermotropic polymers. The disc members have a radiation sensitive microrelief pattern on at least one of the face surfaces thereof.

"Structural Studies of Liquid-Crystalline Poly(ester amides)," N. S. Murthy et al., *Macromolecules*, vol. 25, pages 1177 to 1183 (1992), is directed to a study of the structure of a series of poly(ester amides) by small- and wide-angle X-ray diffraction. Diffuse and weak small-angle X-ray reflections with spacings longer than the chain-axis repeat are reported to be present when the polymer is in the quenched smectic phase, and they become sharp and intense as the crystalline order increases in the presence of a DMF solvent.

Although known compositions and processes are suitable for their intended purposes, a need remains for means for adjusting the glass transition temperatures of thermotropic liquid crystalline polymers. A need also remains for improved toner compositions. In addition, a need remains for improved toner compositions containing liquid crystalline resins and having all the advantages provided thereby. Further, a need remains for toner compositions containing liquid crystalline resins for which the glass transition temperature can be adjusted. Additionally, there is a need for toner compositions containing liquid crystalline resins for which the glass transition temperature is optimized so that the energy required to fuse the toner is minimized. There is also a need for toner compositions containing liquid crystalline resins for which the glass transition temperature is optimized so that blocking (i.e., agglomeration of toner partices under machine dormant conditions) and offset (i.e., transfer of toner from the original receiver sheet, such as paper or transparency material, to other surfaces, such as notebook covers, adjacent receiver sheets in a stack, or the like) is minimized or eliminated.

SUMMARY OF THE INVENTION

It is an object of the present invention to provide thermotropic liquid crystalline compositions with the above noted advantages.

It is another object of the present invention to provide means for adjusting the glass transition temperatures of thermotropic liquid crystalline polymers.

It is yet another object of the present invention to provide improved toner compositions.

It is still another object of the present invention to provide improved toner compositions containing liquid crystalline resins and having all the advantages provided thereby.

Another object of the present invention is to provide toner compositions containing liquid crystalline resins for which the glass transition temperature can be adjusted.

Yet another object of the present invention is to provide toner compositions containing liquid crystalline resins for which the glass transition temperature is optimized so that the energy required to fuse the toner is minimized.

Still another object of the present invention is to provide toner compositions containing liquid crystalline resins for which the glass transition temperature is optimized so that blocking is minimized or eliminated.

It is another object of the present invention to provide toner compositions containing liquid crystalline resins for which the glass transition temperature is optimized so that offset is minimized or eliminated.

These and other objects of the present invention (or specific embodiments thereof) can be achieved by providing a composition comprising a thermotropic liquid crystalline resin and a modifying component selected from the group consisting of plasticizing agents, antiplasticizing agents, small molecule liquid crystalline materials, and mixtures thereof. Another embodiment of the present invention is directed to a toner composition comprising a thermotropic liquid crystalline resin, a colorant, and a modifying component selected from the group consisting of plasticizing agents, antiplasticizing agents, small molecule liquid crystalline materials, and mixtures thereof.

DETAILED DESCRIPTION OF THE INVENTION

The present invention is directed to mixtures of thermotropic liquid crystalline polymers and modifying agents selected from the group consisting of plasticizing agents, antiplasticizing agents, small molecule liquid crystalline materials, and mixtures thereof. Any thermotropic liquid crystalline polymer can be employed in the compositions of the present invention. Examples of thermotropic liquid crystalline polymers include those disclosed and prepared in U.S. Pat. No. 4,543,313, the disclosure of which is totally incorporated herein by reference, including I. Thermotropic liquid crystalline polycarbonates of the formula

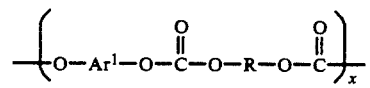

wherein $Ar^1$ is selected from the group consisting of

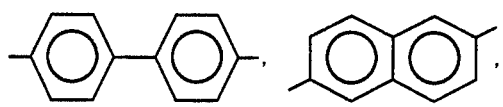

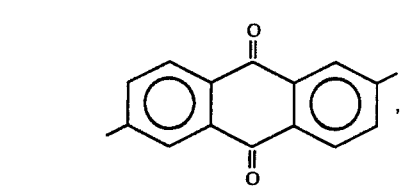

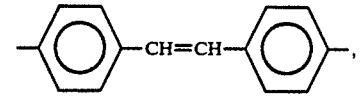

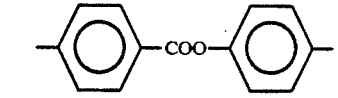

R is selected from the group consisting of $(CH_2)_n$, $(CH_2)_2-O-(CH_2)_2$, and $(CH_2)_2-O-(CH_2)_2-O-(CH_2)_2$, with n being a number of from about 4 to about 12, wherein x represents the degree of polymerization. More specifically, x generally is a number of from about 5 to about 1,000.

II. Thermotropic liquid crystalline copolycarbonates of the formula

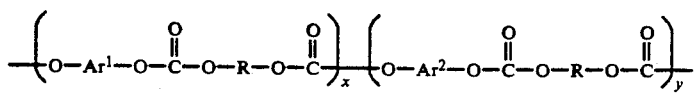

wherein R, $Ar^1$, and x are as defined herein for thermotropic liquid crystalline polycarbonates, y represents the degree of polymerization and, more specifically, is generally a number of from about 5 to about 1,000, and $Ar^2$ is selected from the group consisting of

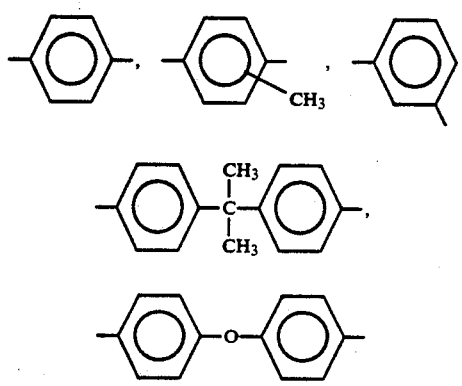

III. Thermotropic liquid crystalline polyurethanes of the formula

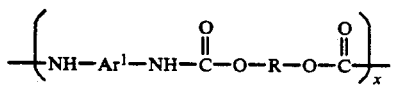

wherein $Ar^1$, R, and x are as defined herein for thermotropic liquid crystalline polycarbonates;

IV. Thermotropic liquid crystalline polyesters of the formula

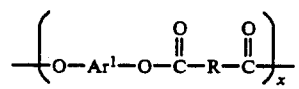

wherein $Ar^1$, R, and x are as defined herein for thermotropic liquid crystalline polycarbonates; and V. Thermotropic liquid crystalline copolyesters of the formula

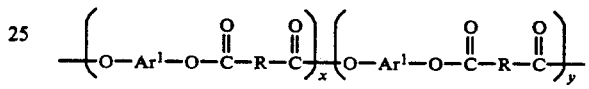

wherein $Ar^1$, $Ar^2$, R, x, and y are as defined herein for thermotropic liquid crystalline copolycarbonates.

Also suitable are thermotropic liquid crystalline polymers as disclosed and prepared in U.S. Pat. No. 4,891,293, the disclosure of which is totally incorporated herein by reference, including polymers of the formula

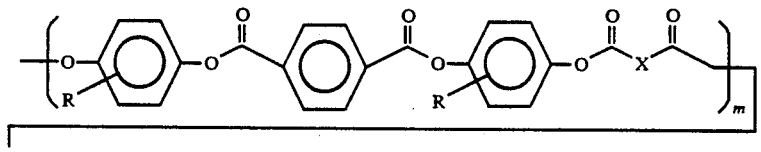

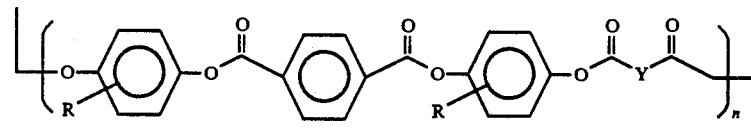

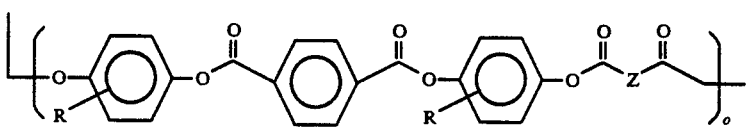

and

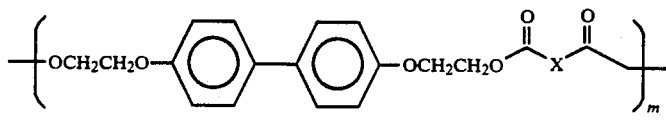

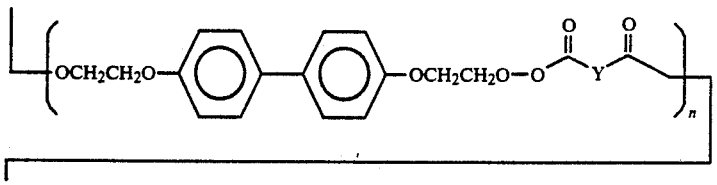

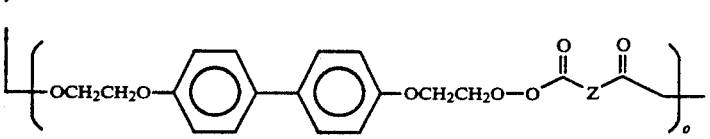

wherein each R is independently selected from the group consisting of hydrogen, alkyl, hydroxyl, nitro, alkoxy, and arylalkoxy, with the alkyl groups preferably having from about 1 to about 25 carbon atoms and the aryl groups preferably having from about 6 to about 24 carbon atoms, m, n, and o represent the number of monomer segments present, and are integers preferably selected so that the weight average molecular weight of the polymer is from about 5,000 to about 50,000, more preferably from about 10,000 to about 35,000, and even more preferably so that each monomeric unit is present in the polymer in an amount of about 33 percent, and X, Y, and Z are independently selected from the group consisting of alkyl, substituted alkyl, alkylene, and substituted alkylene, with the alkyl or alkylene carbons preferably having from about 1 to about 25 carbon atoms, with examples of substituents being alkyl groups, alkoxy groups, arylalkoxy groups, with the alkyl groups preferably having from about 1 to about 25 carbon atoms and the aryl groups preferably having from about 6 to about 24 carbon atoms, nitro, halogen, cyano, hydroxyl, and the like.

Also suitable are thermotropic liquid crystalline polymers as disclosed and prepared in U.S. Pat. No. 4,973,539, the disclosure of which is totally incorporated herein by reference, including polymers of the formula

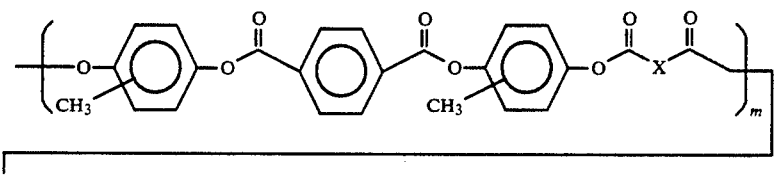

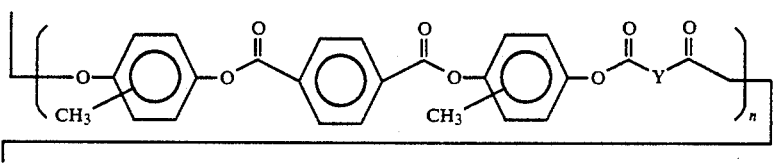

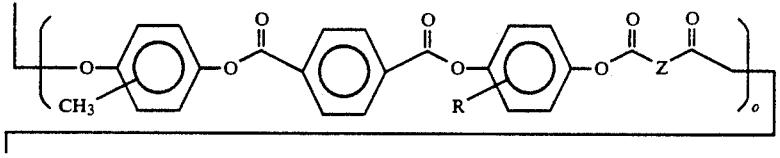

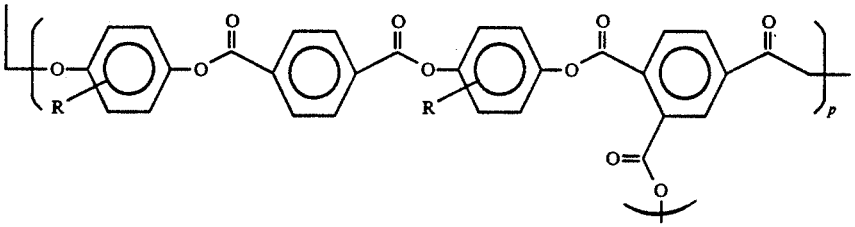

and

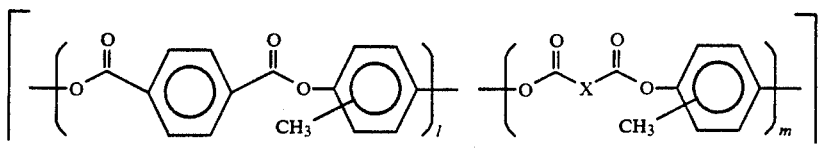

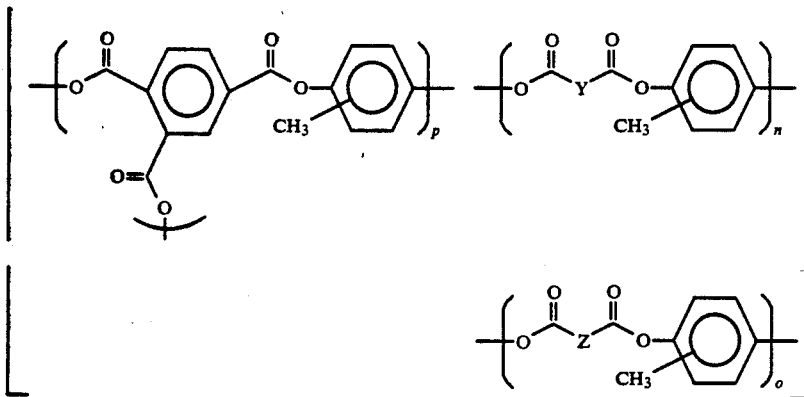

wherein X, Y, and Z are independently selected from the group consisting of alkyl, substituted alkyl, alkylene, and substituted alkylene, with the alkyl or alkylene carbons preferably having from about 1 to about 25 carbon atoms, with examples of substituents including alkyl groups, wherein l, m, n, and o represent the number of monomer segments in the polymer and p represents the percentage or amount of crosslinking segment, preferably with l being about 50 percent by weight of the polymer, m, n, and o each being about 16.1 percent by weight of the polymer, and p being less than 1 percent by weight of the polymer, and preferably about 0.5 percent by weight of the polymer, and wherein the weight average molecular weight of the copolymers is from about 10,000 to about 150,000, and preferably from about 9,000 to 75,000.

Also suitable are thermotropic liquid crystalline polymers as disclosed and prepared in U.S. Pat. No. 5,030,533, the disclosure of which is totally incorporated herein by reference, including polymers of the formula

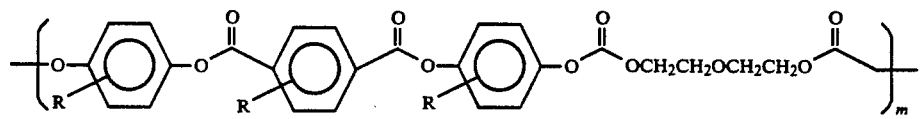

those of the formula

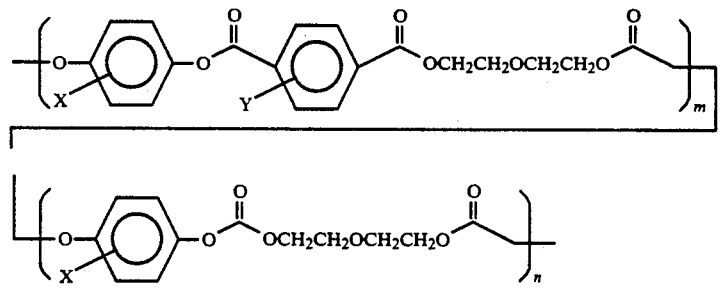

and those of the formula

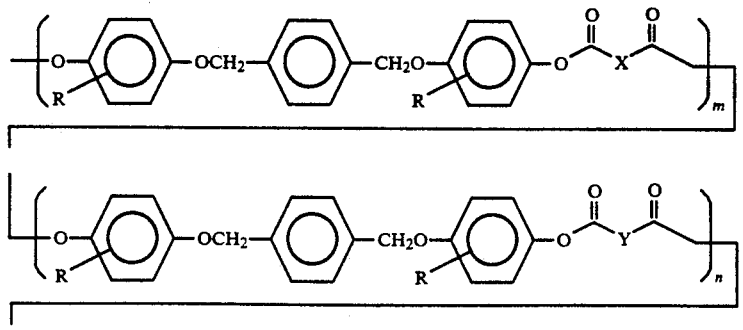

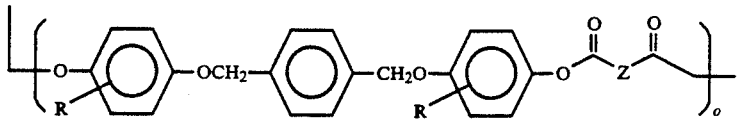

wherein each R is independently selected from the group consisting of hydrogen, alkyl, hydroxyl, nitro, alkoxy, and arylalkoxy, with the alkyl groups preferably having from about 1 to about 25 carbon atoms and the aryl groups preferably having from about 6 to about 24 carbon atoms, m, n, and o represent the number of monomer segments present, and are integers preferably selected so that the weight average molecular weight of the polymer is from about 3,000 to about 50,000, more preferably from about 5,000 to about 35,000, and even more preferably so that each monomeric unit is present in the polymer in an amount of about 33 percent, and X, Y, and Z are independently selected from the group consisting of alkyl, substituted alkyl, alkylene, and substituted alkylene, with the alkyl or alkylene carbons preferably having from about 1 to about 25 carbon atoms, with examples of substituents being alkyl groups, alkoxy groups, arylalkoxy groups, with the alkyl groups preferably having from about 1 to about 25 carbon atoms and the aryl groups preferably having from about 6 to about 24 carbon atoms, nitro, halogen, cyano, hydroxyl, and the like.

Any other thermotropic liquid crystalline polymer can also be employed for the present invention. Mixtures of two or more different thermotropic liquid crystalline polymers can also be employed.

Plasticizing and antiplasticizing agents are known as additives to conventional amorphous polymers, as disclosed in, for example, R. Legras and J. P. Mercier, *J. Polym. Sci., Polym. Phys. Ed.*, 15, 1283 (1977) and *Polym. Eng. Sci.*, 16, 276 (1976), the disclosures of each of which are totally incorporated herein by reference. Examples of suitable plasticizing agents for the present invention include the isomers of phthalic acid derivatives, such as dimethyl terephthalate (DMTP), of the formula

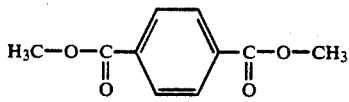

diphenyl terephthalate (DPTP), of the formula

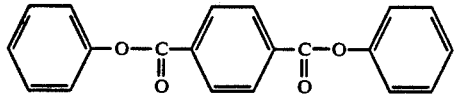

diphenyl isophthalate (DPIP), of the formula

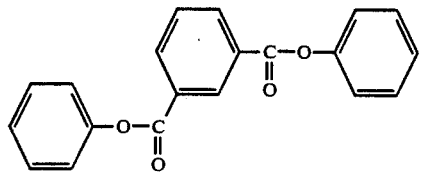

dicyclohexyl phthalate (DCCP), of the formula

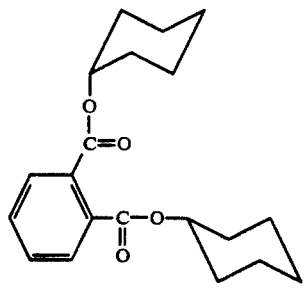

diphenyl phthalate, pentaerythritol tetrabenzoate, trimellitic acid, tridecyloctyl ester, and the like; adipic acid derivatives, such as diisobutyl adipate, di-n-hexyl adipate, and the like; benzoic acid derivatives, such as pentaerythritol tetrabenzoate, diethylene glycol dibenzoate, and the like; citric acid derivatives, such as tri-n-butyl citrate, tribenzyl citrate, and the like; epoxy derivatives, such as bisphenol A diglycidyl ether and the like; glycol derivatives, such as diethylene glycol dipelargonate, polyethylene glycol (carbowax), and the like; hydrocarbon derivatives, such as poly(alkyl naphthalene), o,m,p-triphenyl hydrocarbon mixture (Santowax R), chlorinated paraffin, and the like; phosphoric acid derivatives, such as tributyl phosphate, triphenylphosphate, tritolyl phosphate, pentaerythritol tetranonanoate, and the like; or any other plasticizing agent, as well as mixtures thereof. Examples of suitable antiplasticizing agents for the present invention include biphenyl derivatives, including chlorinated biphenyl (such as Aroclor 1242, available from Monsanto Chemical Co.), dinitro biphenyl, and the like, terphenyl derivatives, including chlorinated terphenyl (such as Aroclor 5442, available from Monsanto Chemical Co.), stilbane derivatives, such as dinitro stilbane, sucrose acetate isobutyrate (available from Eastman Chemical Products), dimethyl diphenyl sulfone, domethoxy diphenyl sulfone, and the like; or any other antiplasticizing agent, as well as mixtures thereof.

In addition to conventional plasticizing or antiplasticizing agents, the modifying additive can also be a small molecule liquid crystalline material. These small molecule liquid crystalline materials can be nematic, smectic, or cholesteric. The term "small molecule," when applied to liquid crystalline materials of the present invention, generally refers to those liquid crystalline materials which have no repeating monomeric units. These materials are not prepared by synthetic processes typically used to prepare polymeric materials, wherein monomeric units are linked together to form a polymeric chain. Typically, the small molecule liquid crystalline materials have molecular weights of 1,200 or less, although there may be exceptions to this general principle. Examples of suitable nematic small molecule liquid crystals include p-methoxybenzylidene-p'-n-butylaniline (MBBA) (CAS Registry 26227-73-6), p-azoxyanisole (PAA), CAS Registry 1562-94-3), p-n-hexyl-p'- cyanobiphenyl (CAS Registry 4122-70-7), p-quinquephenyl (CAS Registry 3073-05-0), and the like, as well as mixtures thereof. In addition, 4-ethoxybenzylidene-4'-n-butylaniline, 4-methoxybenzylidene-4'-aminophenyl butyrate, and bis-(4'-n-octyloxybenzal)-2-chloro-1,4-phenylene-diamine, and mixtures thereof, as disclosed in U.S. Pat. No. 3,655,270 (Creagh), the disclosure of which is totally incorporated herein by reference, can also be used. In yet another example, dialkyl diacetylenes, as disclosed in U.S. Pat. No. 4,615,962 (Garito), the disclosure of which is totally incorporated herein by reference, can also be used. Examples of suitable cholesteric small molecule liquid crystals include cholesteryl nonanoate (CAS Registry 1182-66-7) and 2-methylbutyl-p-(p'-methoxybenzylideneamino)cinnamate (CAS Registry 24140-30-5). Examples of suitable smectic small molecule liquid crystals include ethyl p-(p'-phenylbenzalamino)benzoate (CAS Registry 3782-80-7), ethyl p-ethoxybenzal-p'-aminocinnamate (CAS Registry 2863-94-7), diethyl p-terphenyl-p,p''-carboxylate (CAS Registry 37527-56-3), 2-(p-pentylphenyl)-5-(p-pentyloxyphenyl) pyrimidine (CAS Registry 34913-07-0), and the like, as well as mixtures thereof.

The plasticizer or antiplasticizer or small nonpolymeric liquid crystalline molecule is present in any effective amount. Typically, the plasticizer or antiplasticizer or small nonpolymeric liquid crystalline molecule is present in an amount of from about 0.25 to about 40 percent by weight of the thermotropic liquid crystalline polymer, preferably from 0.25 to about 30 percent by weight of the thermotropic liquid crystalline polymer, more preferably from about 0.5 to about 25 percent by weight of the thermotropic liquid crystalline polymer, more preferably from about 0.5 to about 10 percent by weight of the thermotropic liquid crystalline polymer, more preferably from about 1 to about 5 percent by weight of the thermotropic liquid crystalline polymer, and even more preferably about 2.5 percent by weight of the thermotropic liquid crystalline polymer, although the amount can be outside of these ranges.

The thermotropic liquid crystalline polymers containing plasticizers generally exhibit lowered glass transition temperatures and enhanced flexibility at lower temperatures of, for example, about 25° C. thermotropic liquid crystalline polymers containing antiplasticizers generally exhibit lowered glass transition temperatures and enhanced brittleness at lower temperatures of, for example, about 25° C. Accordingly, the plasticing agents and antiplasticizing agents enable modification and tailoring of the flexibility and glass transition temperature characteristics of the thermotropic liquid crystalline polymers. Small molecule liquid crystal additives also can be expected to lower the glass transition temperature of the liquid crystalline polymer and may also affect modulus. In addition, toner compositions containing thermotropic liquid crystalline polymers as resins can be prepared with brittleness and glass transition temperature characteristics optimized for the intended application of the toner by including plasticizing or antiplasticizing agents in the liquid crystalline resin.

Toner compositions of the present invention generally comprise a thermotropic liquid crystalline resin, a colorant, and a modifying component selected from the group consisting of plasticizing agents, antiplasticizing agents, small nonpolymeric liquid crystalline molecules, and mixtures thereof. Typically, the thermotropic liquid crystalline resin is present in the toner in an amount of from about 30 to about 98 percent by weight, although the amount can be outside this range. The plasticizer or antiplasticizer or small nonpolymeric liquid crystalline molecule typically is present in the toner in an amount of from about 0.25 to about 25 percent by weight, preferably from about 0.5 to about 10 percent by weight, and even more preferably from about 1 to about 5 percent by weight, although the amount can be outside this range.

The colorant component of the toner typically comprises a pigment or a dye. Suitable toner pigments are well known, as disclosed in, for example, U.S. Pat. Nos. 4,543,313, 4,891,293, and 4,973,539, the disclosures of which have previously been totally incorporated herein by reference. Examples of suitable pigments include carbon black, nigrosine dye, aniline blue, magnetites, and mixtures thereof, with carbon black being a preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition, although the amount can be outside of this range.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the Color Index as CI 60710, CI Dispersed Red 15, a diazo dye dientified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These color pigments are generally present in an amount of from about 15 weight percent to about 20.5 weight percent based on the weight of the toner resin particles, although lesser or greater amounts can be present provided that the objectives of the present invention are met.

When the pigment particles are magnetites, which comprise a mixture of iron oxides ($Fe_3O_4$) such as those commercially available as Mapico Black, these pigments are typically present in the toner composition in an amount of from about 10 percent by weight to about 70 percent by weight, and preferably in an amount of from about 20 percent by weight to about 50 percent by weight, although the amount can be outside of these ranges.

The toner compositions of the present invention can, if desired, contain one or more charge control agents, as disclosed in U.S. Pat. Nos. 4,543,313, 4,891,293, and 4,973,539, the disclosures of which have previously been totally incorporated herein by reference. Examples of suitable charge control agents include alkyl pyridinium halides, such as cetyl pyridinium chloride, as disclosed in U.S. Pat. No. 4,298,672, the disclosure of which is totally incorporated herein by reference, cetyl pyridinium tetrafluoroborates, quaternary ammonium sulfate and sulfonate compounds, such as distearyl dimethyl ammonium methyl sulfate, as disclosed in U.S. Pat. No. 4,338,390, the disclosure of which is totally incorporated herein by reference, stearyl phenethyl dimethyl ammonium tosylates, as disclosed in U.S. Pat. No. 4,338,390, distearyl dimethyl ammonium methyl sulfate, as disclosed in U.S. Pat. No. 4,560,635, the disclosure of which is totally incorporated herein by reference, stearyl dimethyl hydrogen ammonium tosylate, charge control agents as disclosed in U.S. Pat. No. 4,294,904, the disclosure of which is totally incorporated herein by reference, or the like, as well as mixtures thereof. When present, the charge control agent is present in an effective amount, generally from about 0.1 to about 4 percent by weight, and preferably from about 0.5 to about 1 percent by weight, although the amount can be outside of these ranges.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a pigment, and an external additive can comprise 80 percent by weight resin and 20 percent by weight pigment; the amount of external additive present is reported in terms of its percent by weight of the combined resin and pigment. External additives can include any additives suitable for use in electrostatographic toners, including straight silica, colloidal silica (e.g. Aerosil R ®, available from Degussa, Inc.), ferric oxide, hydroxy terminated polyethylenes such as Unilin, polypropylene waxes, polymethylmethacrylate, metal salts of fatty acids such as zinc stearate, chromium oxide, aluminum oxide, stearic acid, polyvinylidene fluoride (e.g. Kynar ®, available from Pennwalt Chemicals Corporation), and the like. External additives can be present in any effective amount. Typically, external additives are present in an amount of from about 0.1 to about 4 percent by weight, and more preferably from about 0.5 to about 1 percent by weight.

The toner compositions of the present invention can be prepared by any suitable method. Examples of suitable toner preparation techniques for toners containing thermotropic liquid crystalline polymer resins are disclosed in, for example, U.S. Pat. Nos. 4,543,313, 4,891,293, and 4,973,539, the disclosures of which have previously been totally incorporated herein by reference.

Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including, for example, fluoropolymers such as polyvinylidene fluorides as disclosed in U.S. Pat. Nos. 3,526,533, 3,849,186, and 3,942,979, the disclosures of each of which are totally incorporated herein by reference. The toner and carrier particles can be present in the two-component developer in any effective relative amounts. Typically, the toner concentration is from about 1 to about 5 percent by weight of the carrier, and preferably about 3 percent by weight of the carrier, although the relative amounts of toner and carrier can be outside this range.

Toner and developer compositions of the present invention containing thermotropic liquid crystalline polymers modified with plasticizers or antiplasticizers have a significant advantage in that the brittleness and the glass transition temperature of the toner can be optimized for the desired application. For example, the glass transition temperature can be raised to a degree where little or no blocking of the toner is observed while maintaining the glass transition temperature at the lowest possible value to minimize the amount of energy required to fuse the toner to the paper or other substrate during imaging processes.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A thermotropic liquid crystalline polymer (TLCP) was prepared as follows.

Synthesis of the mesogen di(p-hydroxy-methylphenyl)terephthalate(MPT)

To a solution of methylhydroquinone (697 grams, 5.61 moles) and pyridine (350 milliliters, 4.33 moles) in tetrahydrofuran (1,300 milliliters) was added dropwise a solution of terephthaloyl chloride (219 grams, 1.08 moles) in tetrahydrofuran (400 milliliters), under a nitrogen atmosphere over a 5 hour period (syringe pump). After stirring overnight, the mixture was neutralized with aqueous hydrochloric acid (1 Normal), and the organic extract was separated and washed with brine. The organic portion was then added dropwise to hot water (650° C.), and the resulting slurry was cooled to room temperature and filtered off to yield the crude product. Purification was then accomplished by dissolving the product in acetone, followed by precipitation in hot water (650° C.). The precipitate was then filtered warm (40° to 450° C.). This purification procedure was repeated once more, yielding 319 grams of the product (78% yield), with a melting point in the range 188° to 191° C.

Synthesis of TLC copolyester with two spacers (TLCP #1)

To a solution of MPT (372 grams, 0.984 mole) and pyridine (400 milliliters, 4.95 moles) in methylene chloride (8.5 liters) was added dropwise a solution of glutaryl chloride (62.5 milliliters, 0.49 mole) and sebacoyl chloride (105 milliliters, 0.49 mole) in methylene chloride (750 milliliters), under an inert atmosphere over a 4 hour period (Scheme I).

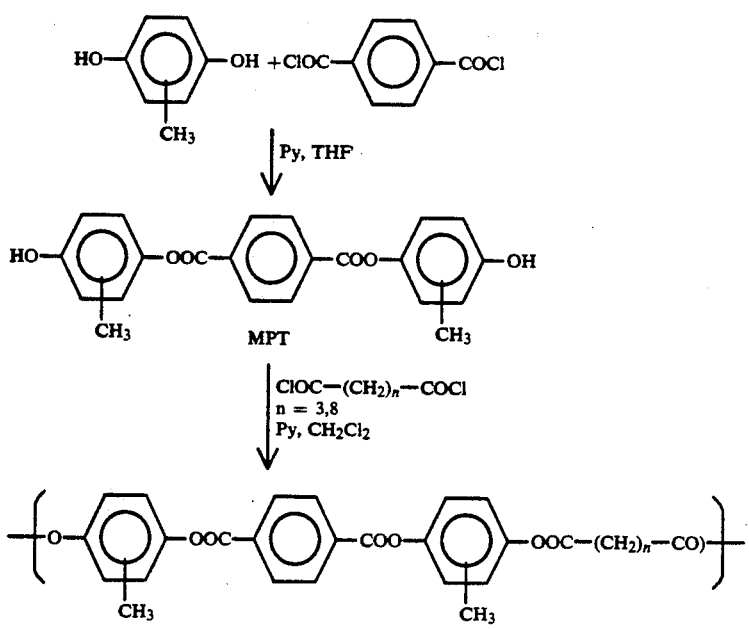

After stirring overnight, the clear solution was washed with aqueous hydrochloric acid (1 Normal), followed by water. The organic extract was then added dropwise to a large excess of hexane, resulting in precipitation of the copolyester. The precipitated copolyester was filtered off and dried to yield 480 grams. This product has a Tg of 52° C., an isotropic clearing temperature (Ti) of 235° C., and a weight average molecular weight of about 50,000 as measured by Gel Permeation Chromatography (GPC) and compared to polystyrene standards. The copolyester was of the formula

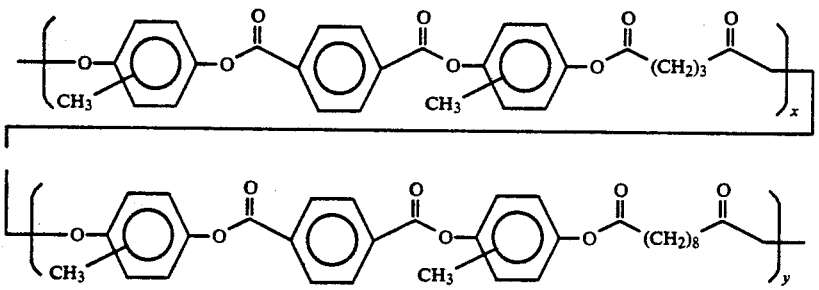

wherein the x monomer segments were present in an amount of 60 percent by weight of the polymer and the y segments were present in an amount of 40 percent by weight of the polymer.

Synthesis of TLC copolyester with two spacers (TLCP #2)

To a solution of MPT (372 grams, 0.984 mole) and pyridine (400 milliliters, 4.95 mole) in methylene chloride (8.5 liters) were added dropwise a solution of glutaryl chloride (62.5 milliliters, 0.49 mole) and sebacoyl chloride (105 milliliters, 0.49 mole) in methylene chloride (750 milliliters) under an inert atmosphere over a 4 hour period. After stirring overnight, the clear solution was washed with aqueous hydrochloric acid (1 Normal), followed by water. The organic extract was then added dropwise to large excess of hexane, whereby the precipitated copolyester was filtered off and dried to yield 480 grams. This product has a Tg of 52° C. and an isotropic clearing temperature (Ti) of 190° C., the weight average molecular weight of the polymer being about 50,000 as measured by Gel Permeation Chromatography (GPC) and compared to polystyrene standards. The copolyester was of the formula

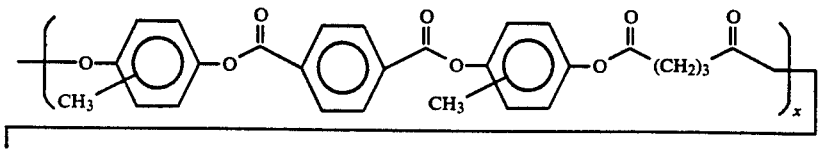

-continued

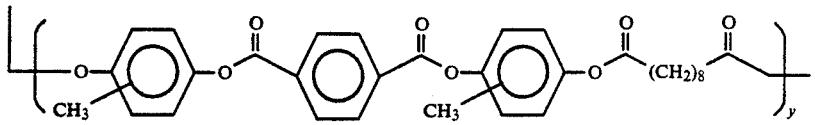

wherein the x monomer segments were present in an amount of 50 percent by weight of the polymer and the y segments were present in an amount of 50 percent by weight of the polymer.

Each TLCP was blended with varying amounts of the plasticizing agents dimethyl terephthalate (DMTP), obtained from Scientific Polymer Products Inc., New York, dicyclohexyl phthalate (DCCP), obtained from Scientific Polymer Products Inc., New York, diphenyl isophthalate (DPIP), obtained from K & K Laboratories, Cleveland, Ohio, and diphenyl terephthalate (DPTP), obtained from K & K Laboratories, Cleveland, Ohio, by blending the TLCP with the plasticizer in dichloromethane to obtain solutions containing 10 percent by weight solids. The solutions were stirred for about 20 hours and stored in amber glass bottles with Teflon ® lined lids. Subsequently, the solutions were coated onto Mylar ® polyester film with a draw bar coater with a gap height of the bar of 25 mils. Immediately following coating, the films were covered with an aluminum pan for about 10 minutes to slow the evaporation rate of the solvent, thereby avoiding "orange-peel" texturizing of the surface. The films were thereafter dried for about 48 hours at room temperature to ensure complete removal of all solvent.

Scanning electron microscopy of the films was carried out on a Phillips SEM505 scanning electron microscope operating at an acceleration voltage of 15 Kv and using a spot size of 50 nanometers. Samples for scanning electron microscopy were mounted on aluminum stubs and coated with 15 nanometers of gold/palladium on a Polaron ES100 sputter coater. A Zeiss axioplan microscope was used for polarized optical microscopy. A Leitz hotstage was utilized for sample heating. Samples were obtained from the prepared films and mounted on glass slides with cover slips. Differential scanning calorimetry (DSC) of the TLCPs was carried out using a DuPont Thermal Analyzer 2100. The following method was used:

(i) equilibrate at −25° C.
(ii) ramp at 20° C. per minute to 200° C.
(iii) quench to −25° C.
(iv) ramp at 20° C. per minute to 325° C.

for the differential scanning calorimetry samples, data was collected only on the heating cycle. Sample weights of about 5 milligrams were used. The samples were sealed in aluminum pans. Rheological measurements were carried out on a Rheometrics RMS4 rheometer, at a temperature sweep of 2° C. per minute and a frequency of 1 radian per second. The strain amplitude was kept constant at 1 percent.

The following glass transition temperatures (Tg) were observed for blends of TLCP #1 with the plasticizers. Amounts of plasticizers are expressed as percentages by weight of the weight of TLCP #1. The onset was taken to be the temperature at which the slope of the DSC trace first began to deviate, and the inflection was taken as the temperature at which the rate of change of the slope was a maximum.

| Plasticizer | TLCP #1 Visual Inspection | Scan 1 Tg (°C.) onset inflection | Scan 2 Tg (°C.) onset inflection |
|---|---|---|---|
| none | clear and colorless | 55 59 | 45 50 |
| DMTP 2.5% | clear and colorless | 46 50 | 32 38 |
| DMTP 10% | heavy crystallization | 31 41 | none |
| DCCP 2.5% | clear and colorless | 34 44 | 42 51 |
| DCCP 10% | cloudy in some areas | 40 47 | 42 49 |
| DPIP 2.5% | clear and colorless | 34 46 | 35 46 |
| DPTP 2.5% | clear and colorless | 42 48 | 32 42 |

The following glass transition temperatures (Tg) and melting points (MP) were observed for blends of TLCP #2 with the plasticizers. Amounts of plasticizers are expressed as percentages by weight of the weight of TLCP #2.

| Plasticizer | TLCP #2 Visual Inspection | Scan 1 Tg (°C.) onset inflection Mp (°C.) | Scan 2 Tg (°C.) onset inflection Mp (°C.) |
|---|---|---|---|
| none | slight cloudiness | 53 55 155 | 44 49 148 |
| DMTP 2.5% | slight cloudiness | 41 47 unknown | 31 37 139 |
| DMTP 10% | heavy crystallization | 37 54 none | 23 28 none |
| DCCP 2.5% | slight cloudiness | 32 42 none | 31 41 142 |
| DCCP 10% | slight cloudiness | 34 42 152 | 39 45 140 |
| DPIP 2.5% | slight cloudiness in areas | 46 51 unknown | 35 43 144 |
| DPTP 2.5% | heavy crystallization | 50 54 unknown | 44 50 142 |

These results indicate that the presence of plasticizing agents in the TLCPs tends to decrease the glass transition temperatures of the polymers. Increasing the concentration of the plasticizer from 2.5% to 10% frequently had little effect on the degree of alteration of the Tg.

EXAMPLE II

A composite is prepared containing 90 percent by weight of TLCP #1 prepared as described in Example I and 10 percent by weight of an antiplasticizer, Aroclor®, available from Monsanto, by the procedure described in Example I. It is believed that the glass transition temperature of the composite will be about 10° C. lower than the glass transition temperature of the pure TLCP #1, and that the modulus of the composite will be about 50 percent greater than the modulus of the pure TLCP #1.

EXAMPLE III

A toner composition is prepared as described in Example I of U.S. Pat. No. 4,543,313 with the exception that the toner contained, in addition to the 80 parts by weight of liquid crystalline diethylene polycarbonate and 20 parts by weight of magnetite, 2.5 parts by weight of DPTP (K & K Laboratories, Cleveland, Ohio). The black toner particles are then admixed with carrier particles as described in Example I of U.S. Pat. No. 4,543,313 to form a developer composition.

EXAMPLE IV

A toner composition is prepared as described in Example II of U.S. Pat. No. 4,543,313 with the exception that the toner contained, in addition to the 80 parts by weight of liquid crystalline copolycarbonate and 20 parts by weight of magnetite, 1 part by weight of DCCP (Scientific Polymer Products, Ontario, N.Y.). The black toner particles are then admixed with carrier particles as described in Example I of U.S. Pat. No. 4,543,313 to form a developer composition.

EXAMPLE V

A toner composition is prepared as described in Example V of U.S. Pat. No. 4,543,313 with the exception that the toner contained, in addition to the 80 parts by weight of liquid crystalline polyester and 20 parts by weight of magnetite, 5 parts by weight of DMTP (Eastman Kodak Co.). The black toner particles are then admixed with carrier particles as described in Example I of U.S. Pat. No. 4,543,313 to form a developer composition.

EXAMPLE VI

A toner composition is prepared as described in Example VI of U.S. Pat. No. 4,543,313 with the exception that the toner contained, in addition to the 80 parts by weight of liquid crystalline copolyester and 20 parts by weight of magnetite, 5 parts by weight of diphenyl isophthalate (K & K Laboratories, Cleveland, Ohio). The black toner particles are then admixed with carrier particles as described in Example I of U.S. Pat. No. 4,543,313 to form a developer composition.

EXAMPLE VII

A toner composition is prepared as described in Example XIV of U.S. Pat. No. 4,891,293 with the exception that the toner contained, in addition to the 89 parts by weight of liquid crystalline copolyester, 10 parts by weight carbon black, and 1 part by weight of distearyl dimethyl ammonium methyl sulfate, 2.5 parts by weight of dimethyl isophthalate (Scientific Polymer Products, Ontario, N.Y.). The black toner particles are then admixed with carrier particles as described in Example XIV of U.S. Pat. No. 4,891,293 to form a developer composition.

EXAMPLE VIII

A toner composition is prepared as described in Example IX of U.S. Pat. No. 4,973,539 with the exception that the toner contained, in addition to the 80 parts by weight of liquid crystalline copolyester and 20 parts by weight of magnetite, 5 parts by weight of triphenyl phosphate (Scientific Polymer Products, Ontario, N.Y.). The black toner particles are then admixed with carrier particles as described in Example IX of U.S. Pat. No. 4,973,539 to form a developer composition.

EXAMPLE IX

A toner composition is prepared as described in Example I of U.S. Pat. No. 4,543,313 with the exception that the toner contained, in addition to the 80 parts by weight of liquid crystalline diethylene polycarbonate and 20 parts by weight of magnetite, 10 parts by weight of a chlorinated terphenyl, (Aroclor 5442, Monsanto). The black toner particles are then admixed with carrier particles as described in Example I of U.S. Pat. No. 4,543,313 to form a developer composition.

EXAMPLE X

A toner composition is prepared as described in Example II of U.S. Pat. No. 4,543,313 with the exception that the toner contained, in addition to the 80 parts by weight of liquid crystalline copolycarbonate and 20 parts by weight of magnetite, 5 parts by weight of dinitro biphenyl. The black toner particles are then admixed with carrier particles as described in Example I of U.S. Pat. No. 4,543,313 to form a developer composition.

EXAMPLE XI

A toner composition is prepared as described in Example V of U.S. Pat. No. 4,543,313 with the exception that the toner contained, in addition to the 80 parts by weight of liquid crystalline polyester and 20 parts by weight of magnetite, 10 parts by weight of 2,4 dinitro stilbane. The black toner particles are then admixed with carrier particles as described in Example I of U.S. Pat. No. 4,543,313 to form a,developer composition.

EXAMPLE XII

A toner composition is prepared as described in Example VI of U.S. Pat. No. 4,543,313 with the exception that the toner contained, in addition to the 80 parts by weight of liquid crystalline copolyester and 20 parts by weight of magnetite, 2.5 parts by weight of dimethyl diphenyl sulfone. The black toner particles are then admixed with carrier particles as described in Example I of U.S. Pat. No. 4,543,313 to form a developer composition.

EXAMPLE XIII

A toner composition is prepared as described in Example XIV of U.S. Pat. No. 4,891,293 with the exception that the toner contained, in addition to the 89 parts by weight of liquid crystalline copolyester, 10 parts by weight carbon black, and 1 part by weight of distearyl dimethyl ammonium methyl sulfate, 5 parts by weight of dimethoxy diphenyl sulfone. The black toner particles are then admixed with carrier particles as described in Example XIV of U.S. Pat. No. 4,891,293 to form a developer composition.

EXAMPLE XIV

A toner composition is prepared as described in Example IX of U.S. Pat. No. 4,973,539 with the exception that the toner contained, in addition to the 80 parts by weight of liquid crystalline copolyester and 20 parts by weight of magnetite, 1 part by weight of chlorinated biphenyl (Aroclor 1242, Monsanto). The black toner particles are then admixed with carrier particles as described in Example IX of U.S. Pat. No. 4,973,539 to form a developer composition.

EXAMPLE XV

A toner composition is prepared as described in Example I of U.S. Pat. No. 4,543,313 with the exception that the toner contained, in addition to the 80 parts by weight of liquid crystalline diethylene polycarbonate and 20 parts by weight of magnetite, 10 parts by weight of 4-ethoxybenzylidene-4'-n-butylaniline. The black toner particles are then admixed with carrier particles as described in Example I of U.S. Pat. No. 4,543,313 to form a developer composition.

EXAMPLE XVI

A toner composition is prepared as described in Example II of U.S. Pat. No. 4,543,313 with the exception that the toner contained, in addition to the 80 parts by weight of liquid crystalline copolycarbonate and 20 parts by weight of magnetite, 5 parts by weight of p-azoxyanisole. The black toner particles are then admixed with carrier particles as described in Example I of U.S. Pat. No. 4,543,313 to form a developer composition.

EXAMPLE XVII

A toner composition is prepared as described in Example V of U.S. Pat. No. 4,543,313 with the exception that the toner contained, in addition to the 80 parts by weight of liquid crystalline polyester and 20 parts by weight of magnetite, 10 parts by weight of chloesteryl nonanoate. The black toner particles are then admixed with carrier particles as described in Example I of U.S. Pat. No. 4,543,313 to form a developer composition.

EXAMPLE XVIII

A toner composition is prepared as described in Example VI of U.S. Pat. No. 4,543,313 with the exception that the toner contained, in addition to the 80 parts by weight of liquid crystalline copolyester and 20 parts by weight of magnetite, 2.5 parts by weight of 2-methylbutyl-p-(p'-methoxybenzylideneamino)cinnamate. The black toner particles are then admixed with carrier particles as described in Example I of U.S. Pat. No. 4,543,313 to form a developer composition.

EXAMPLE XIX

A toner composition is prepared as described in Example XIV of U.S. Pat. No. 4,891,293 with the exception that the toner contained, in addition to the 89 parts by weight of liquid crystalline copolyester, 10 parts by weight carbon black, and 1 part by weight of disteryl dimethyl ammonium methyl sulfate, 5 parts by weight of ethyl p-(p'-phenylbenzalamino)benzoate. The black toner particles are then admixed with carrier particles as described in Example XIV of U.S. Pat. No. 4,891,293 to form a developer composition.

EXAMPLE XX

A toner composition is prepared as described in Example IX of U.S. Pat. No. 4,973,539 with the exception that the toner contained, in addition to the 80 parts by weight of liquid crystalline copolyester and 20 parts by weight of magnetite, 1 part by weight of diethyl p-terphenyl-p, p"-carboxylate. The black toner particles are then admixed with carrier particles as described in Example IX of U.S. Pat. No. 4,973,539 to form a developer composition.

Other embodiments and modifications of the present invention may occur to those skilled in the art subsequent to a review of the information presented herein; these embodiments and modifications, as well as equivalents thereof, are also included within the scope of this invention.

What is claimed is:

1. A toner composition comprising a thermotropic liquid crystalline resin, a colorant, and a modifying component selected from the group consisting of plasticizing agents, antiplasticizing agents, small molecule liquid crystalline materials, and mixtures thereof.

2. A toner composition according to claim 1 wherein the thermotropic liquid crystalline resin is selected from the group consisting of polycarbonates, copolycarbonates, polyurethanes, polyesters, copolyesters, and mixtures thereof.

3. A toner composition according to claim 1 wherein the modifying component is a plasticizing agent.

4. A toner composition according to claim 3 wherein the plasticizing agent is present in an amount of from about 0.25 to about 30 percent by weight of the thermotropic liquid crystalline polymer.

5. A toner composition according to claim 3 wherein the plasticizing agent is present in an amount of from about 0.5 to about 10 percent by weight of the thermotropic liquid crystalline polymer.

6. A toner composition according to claim 3 wherein the plasticizing agent is selected from the group consisting of isomers of phthalic acid derivatives, adipic acid derivatives, benzoic acid derivatives, citric acid derivatives, epoxy derivatives, glycol derivatives, hydrocarbon derivatives, phosphoric acid derivatives, and mixtures thereof.

7. A toner composition according to claim 3 wherein the plasticizing agent is selected from the group consisting of dimethyl terephthalate, diphenyl terephthalate, diphenyl isophthalate, dicyclohexyl phthalate, diphenyl phthalate, pentaerythritol tetrabenzoate, trimellitic acid, tridecyloctyl ester, diisobutyl adipate, di-n-hexyl adipate, diethylene glycol dibenzoate, tri-n-butyl citrate, tribenzyl citrate, bisphenol A diglycidyl ether, diethylene glycol dipelargonate, polyethylene glycol, poly(alkyl naphthalene), o,m,p-triphenyl hydrocarbon mixture, chlorinated paraffin, tributyl phosphate, triphenylphosphate, tritolyl phosphate, pentaerythritol tetranonanoate, and mixtures thereof.

8. A toner composition according to claim 1 wherein the modifying component is an antiplasticizing agent.

9. A toner composition according to claim 8 wherein the antiplasticizing agent is present in an amount of from about 0.25 to about 30 percent by weight of the thermotropic liquid crystalline polymer.

10. A toner composition according to claim 8 wherein the antiplasticizing agent is present in an amount of from about 0.5 to about 10 percent by weight of the thermotropic liquid crystalline polymer.

11. A toner composition according to claim 8 wherein the antiplasticizing agent is selected from the group consisting of biphenyl derivatives, terphenyl derivatives, stilbane derivatives, and mixtures thereof.

12. A toner composition according to claim 8 wherein the antiplasticizing agent is selected from the group consisting of chlorinated biphenyl, dinitro biphenyl, chlorinated terphenyl, dinitro stilbane, sucrose acetate isobutyrate, dimethyl diphenyl sulfone, domethoxy diphenyl sulfone, and mixtures thereof.

13. A toner composition according to claim 1 wherein the modifying component is a small molecule liquid crystalline material.

14. A toner composition according to claim 13 wherein the small molecule liquid crystalline material is present in an amount of from about 0.25 to about 40 percent by weight of the thermotropic liquid crystalline polymer.

15. A toner composition according to claim 13 wherein the small molecule liquid crystalline material is present in an amount of from about 0.5 to about 10 percent by weight of the thermotropic liquid crystalline polymer.

16. A toner composition according to claim 13 wherein the small molecule liquid crystalline material is selected from the group consisting of p-methoxybenzylidene-p'-n-butylaniline, p-azoxyanisole, p-n-hexyl-p'-cyanobiphenyl, p-quinquephenyl, 4-ethoxybenzylidene-4'-n-butylaniline, 4-methoxybenzylidene-4'-amino-phenyl butyrate, bis-(4'-n-octyloxybenzal)-2-chloro-1,4-phenylene-diamine, dialkyl diacetylenes, cholesteryl nonanoate, 2-methylbutyl-p-(p'-methoxybenzylideneamino) cinnamate, ethyl p- (p'-phenylbenzalamino) benzoate, ethyl p-ethoxybenzal-p'-aminocinnamate, diethyl p-terphenyl- p,p''-carboxylate, 2-(p-pentylphenyl)-5-(p-pentyloxyphenyl) pyrimidine, and mixtures thereof.

17. A composition comprising a thermotropic liquid crystalline polymer and a modifying component selected from the group consisting of (a) plasticizing agents selected from the group consisting of isomers of phthalic acid derivatives, adipic acid derivatives, benzoic acid derivatives, citric acid derivatives, epoxy derivatives, glycol derivatives, hydrocarbon derivatives, phosphoric acid derivatives, and mixtures thereof; (b) antiplasticizing agents; (c) small molecule liquid crystalline materials; and mixtures thereof.

18. A composition according to claim 17 wherein the modifying agent is a plasticizing agent present in an amount of from about 0.25 to about 30 percent by weight of the thermotropic liquid crystalline polymer.

19. A composition according to claim 18 wherein the plasticizing agent is selected from the group consisting of dimethyl terephthalate, diphenyl terephthalate, diphenyl isophthalate, dicyclohexyl phthalate, diphenyl phthalate, pentaerythritol tetrabenzoate, trimellitic acid, tridecyloctyl ester, diisobutyl adipate, di-n-hexyl adipate, diethylene glycol dibenzoate, tri-n-butyl citrate, tribenzyl citrate, bisphenol A diglycidyl ether, diethylene glycol dipelargonate, polyethylene glycol, poly(alkyl naphthalene), o,m,p-triphenyl hydrocarbon mixture, chlorinated paraffin, tributyl phosphate, triphenylphosphate, tritolyl phosphate, pentaerythritol tetranonanoate, and mixtures thereof.

20. A composition according to claim 17 wherein the modifying agent is an antiplasticizing agent present in an amount of from about 0.25 to about 30 percent by weight of the thermotropic liquid crystalline polymer.

21. A composition according to claim 20 wherein the antiplasticizing agent is selected from the group consisting of biphenyl derivatives, terphenyl derivatives, stilbane derivatives, and mixtures thereof.

22. A composition according to claim 20 wherein the antiplasticizing agent is selected from the group consisting of chlorinated biphenyl, dinitro biphenyl, chlorinated terphenyl, dinitro stilbane, sucrose acetate isobutyrate, dimethyl diphenyl sulfone, domethoxy diphenyl sulfone, and mixtures thereof.

23. A composition according to claim 17 wherein the modifying component is a small liquid crystalline molecule present in an amount of from about 0.25 to about 40 percent by weight of the thermotropic liquid crystalline polymer.

24. A composition according to claim 23 wherein the small liquid crystalline molecule is selected from the group consisting of p-methoxybenzylidene-p'-n-butylaniline, p-azoxyanisole, p-n-hexyl-p'-cyanobiphenyl, p-quinquephenyl, 4-ethoxybenzylidene-4'-n-butylaniline, 4-methoxybenzylidene-4'-amino-phenyl butyrate, bis-(4'-n-octyloxybenzal)-2-chloro-1,4-phenylene-diamine, dialkyl diacetylenes, cholesteryl nonanoate, 2-methylbutyl-p-(p'-methoxybenzylideneamino) cinnamate, ethyl p-(p'-phenylbenzalamino) benzoate, ethyl p-ethoxybenzal-p'-aminocinnamate, diethyl p-terphenyl-p,p''-carboxylate, 2-(p-pentylphenyl)-5-(p-pentyloxyphenyl) pyrimidine, and mixtures thereof.

* * * * *